(12) United States Patent
Iurilli

(10) Patent No.: US 9,366,882 B2
(45) Date of Patent: Jun. 14, 2016

(54) EYEGLASSES COMPRISING ELECTRICAL AND/OR ELECTRONIC ELEMENTS

(71) Applicant: Michele Iurilli, Genoa (IT)

(72) Inventor: Michele Iurilli, Genoa (IT)

( * ) Notice: Subject to any disclaimer, the term of this patent is extended or adjusted under 35 U.S.C. 154(b) by 0 days.

(21) Appl. No.: 14/402,127

(22) PCT Filed: May 17, 2013

(86) PCT No.: PCT/IB2013/054039
§ 371 (c)(1),
(2) Date: Nov. 19, 2014

(87) PCT Pub. No.: WO2013/175367
PCT Pub. Date: Nov. 28, 2013

(65) Prior Publication Data
US 2015/0131048 A1    May 14, 2015

(30) Foreign Application Priority Data

May 21, 2012    (IT) .............................. GE2012A0054

(51) Int. Cl.
| | |
|---|---|
| G02C 1/00 | (2006.01) |
| G02C 11/00 | (2006.01) |
| G02C 11/04 | (2006.01) |
| G02C 5/14 | (2006.01) |
| G02C 5/22 | (2006.01) |

(52) U.S. Cl.
CPC *G02C 11/10* (2013.01); *G02C 5/14* (2013.01); *G02C 5/22* (2013.01); *G02C 11/04* (2013.01)

(58) Field of Classification Search
CPC ............ G02C 5/14; G02C 5/22; G02C 11/00; G02C 11/04; G02C 11/10
USPC .................................... 351/41, 153, 154, 158
See application file for complete search history.

(56) References Cited

U.S. PATENT DOCUMENTS

| | | | |
|---|---|---|---|
| 4,254,451 A * | 3/1981 | Cochran, Jr. ....... | A44C 15/0015 315/323 |
| 5,027,394 A | 6/1991 | Ono | |
| 5,394,297 A | 2/1995 | Toedter | |
| 5,455,638 A | 10/1995 | Kallman | |
| 2007/0200998 A1* | 8/2007 | Schrimmer ............ | G02C 11/04 351/158 |

FOREIGN PATENT DOCUMENTS

| | | |
|---|---|---|
| WO | 9735085 | 9/1997 |
| WO | 2010080999 | 7/2010 |

* cited by examiner

*Primary Examiner* — Huy K Mai
(74) *Attorney, Agent, or Firm* — Themis Law

(57) ABSTRACT

Eyeglasses including a front frame to which two side arms are connected, and having electric and/or electronic elements connected to each other by an electric circuit, wherein the electric circuit is composed at least partially of at least one flexible printed circuit, which is housed into a seat formed at least partially inside the front frame and at least partially inside at least one arm.

12 Claims, 5 Drawing Sheets

EYEGLASSES COMPRISING ELECTRICAL AND/OR ELECTRONIC ELEMENTS

FIELD OF THE INVENTION

The present invention relates to eyeglasses comprising a front frame to which two side arms are connected, said eyeglasses comprising electric and/or electronic elements connected to each other by means of an electric circuit.

BACKGROUND OF THE INVENTION

The use of electric and/or electronic elements mounted on eyeglasses or integrated inside the frame thereof is known and is acquiring a more and more important role with the miniaturization of the involved components.

Eyeglasses, due to their function related to a sense of fundamental importance such as eyesight, due to their easy wearability and to their closeness to ears and mouth, are highly fit for being a technological instrument on which different systems can be integrated such as operating units, processing units, transmission units or the like.

Electric and/or electronic elements generally comprise one or more batteries for powering the additional electric and/or electronic elements, which are typically placed in the arms.

For the electric connection between batteries and electric and/or electronic elements generally electric wires are used, which are welded to said electric and/or electronic elements and to suitable connectors for the batteries and are left loose or are housed in suitable seats formed in the thickness of the front frame and/or of the arms.

The use of welded electric wires has some drawbacks such as some difficulty in assembling and the possibility of breaking due to wear by using the eyeglasses.

SUMMARY OF THE INVENTION

The present invention aims at overcoming said prior art drawbacks in eyeglasses such as described hereinbefore, wherein in addition said electric circuit is composed at least partially of at least one flexible printed circuit, which is housed in a seat formed at least partially inside said front frame and at least partially inside at least one arm.

According to one embodiment, said electric and/or electronic elements comprise one or more batteries housed into predetermined housing compartments formed inside said arms and/or said front frame, wherein said electric circuit is composed of a single flexible printed circuit and said electric and/or electronic elements are connected thereto or are integrated thereon.

Thus the electric and/or electronic elements can be placed in the front frame or in at least one arm and can be connected in a firm and resistant manner to the batteries by using a single flexible printed circuit or preferably being integrated thereon.

As an alternative, the batteries can be placed outside the frame.

According to a preferred embodiment, there are provided at least two batteries housed in at least two predetermined housing compartments formed inside each of said two arms, said flexible printed circuit being housed in a seat formed inside said front frame and inside both said arms.

This allows all the electric and/or electronic elements to be connected to the batteries provided in the arm by a single printed circuit, that is, in contact with both of the batteries by passing inside a portion of the arms and in the front frame, and by being housed in said suitable seat.

According to one embodiment, said seat has, for most of its extension, a thickness corresponding to the thickness of said flexible printed circuit.

This guarantees that the printed circuit is held firm as much as possible into the seat, and it is not subjected to movements that can lead to deformations or breaking over time.

According to a further embodiment, said arms are at least partially made of a rigid material.

Such rigid material can be of any type currently used for eyeglasses, particularly a plastic material that substantially is not subjected to elastic deformations.

According to a preferred embodiment, the material is composed of a polyamide based technopolymer 12. In a further embodiment, at the areas of connection between said arms and the front frame, there are provided hinges for articulating said arms, such that each arm is pivotally movable about a pivot axis substantially perpendicular to the longitudinal axis of the arm and to the interpupillary line when the eyeglasses are worn, from an extreme folding position wherein said arm is oriented collapsed against the rear side of the front frame to an extreme deployment position wherein it is moved away from the opposite arm and it is substantially transverse to the extension of the front frame. In these eyeglasses at least one of said hinges is shaped such to be provided, at the extrados side, with a first, curved and seamless resting surface, such that, when pivoting the arm from said extreme deployment position to said extreme folding position, said resting surface contacts a larger and larger portion of said printed circuit, pulling out a predetermined portion of said printed circuit from said front frame and/or from said arm by dragging it.

This allows the arms to be folded when the eyeglasses are not in the worn condition, as in conventional eyeglasses, and therefore more compact dimensions can be obtained for putting the eyeglasses away.

Since the flexible printed circuit cannot be either extended or folded below a limit radius of curvature, otherwise it is irreversibly folded, it is pulled out for a predetermined length portion from the front frame and/or from the arm when pivoting the arm up to the extreme folding position.

According to a further embodiment said seat housing said flexible printed circuit in said front frame and/or in at least one arm has at least one widening intended to house said predetermined portion of said printed circuit when the arm is in the deployment position.

The widening is preferably placed at least at one hinge.

Said widening advantageously acts as a storage for recovering the abundance of the extension of the printed circuit which is created when pivoting the arm up to the extreme deployment position, said abundance corresponding to said predetermined portion of the printed circuit.

The widening is preferably provided in the front frame.

In this case, when the arm is in the extreme deployment position, said portion of printed circuit is in said front frame, and is pulled out from such front frame by dragging it by said first resting surface when pivoting the arm in the direction of the extreme folding position.

As an alternative or in combination, the widening can be provided into the arm, and in a way completely similar to what was described above, said predetermined portion of printed circuit is pulled out or inserted into the arm when pivoting it in the two extreme positions respectively.

The fact of providing a widening is particularly advantageous when the arms are rigid and the seat housing the printed circuit for most of its extension has a thickness corresponding to the thickness of the flexible printed circuit.

In this case the printed circuit is held firm into the seat except for the area of the hinge, in the widening area, and in the part between such two areas, thus reducing at the greatest extent the movements of the flexible printed circuit and avoiding wear, breaking or bending.

In a further embodiment, said widening is provided with at least a second curved and seamless resting surface such that, with the arm in the extreme deployment position, said predetermined portion of the flexible printed circuit is inserted into said widening, causing said flexible printed circuit to bend, such that the convex side of said flexible printed circuit contacts at least partially said second resting surface.

In still a further embodiment, said widening is provided with a third curved and seamless resting surface such that with the arm in the extreme folding position. Said predetermined portion of the flexible printed circuit is pulled out from said widening causing said flexible printed circuit to extend, such that the concave side of said flexible printed circuit contacts at least partially said third resting surface.

The provision of a second and a third resting surface inside said widening guarantees stability in the position of the printed circuit when the arms are in the extreme deployment or folding positions.

In a preferred embodiment, said first resting surface and/or said second resting surface and/or said third resting surface has such radii of curvature to prevent said flexible printed circuit from being subjected to permanent bending when resting on said first resting surface and/or said second resting surface and/or said third resting surface.

This expedient has the advantage of allowing the arms to fold while preventing each movable part of the flexible printed circuit from being bent too much, which could lead to irreversible deformations and then to breaking.

Said electric and/or electronic elements can be of any type, provided that they are intended for being mounted on eyeglasses.

Particularly, according to a first embodiment, said electric and/or electronic elements comprise one or more LEDs.

According to a further embodiment, said electric and/or electronic elements comprise sensor means and/or processing means and/or remote communication means and/or displaying and sound speaker means.

Such means can for example comprise a remote wireless communication unit, a microphone, one or more sound speakers, a video camera, a luxmeter, a display, a GPS device, a compass, one or more accelerometers and/or inclinometers, or the like.

BRIEF DESCRIPTION OF THE DRAWINGS

These and other characteristics and advantages of the present invention will be more clear from the following description of some embodiments shown in the annexed drawings, wherein.

DETAILED DESCRIPTION OF EMBODIMENTS OF THE INVENTION

Figure 1:
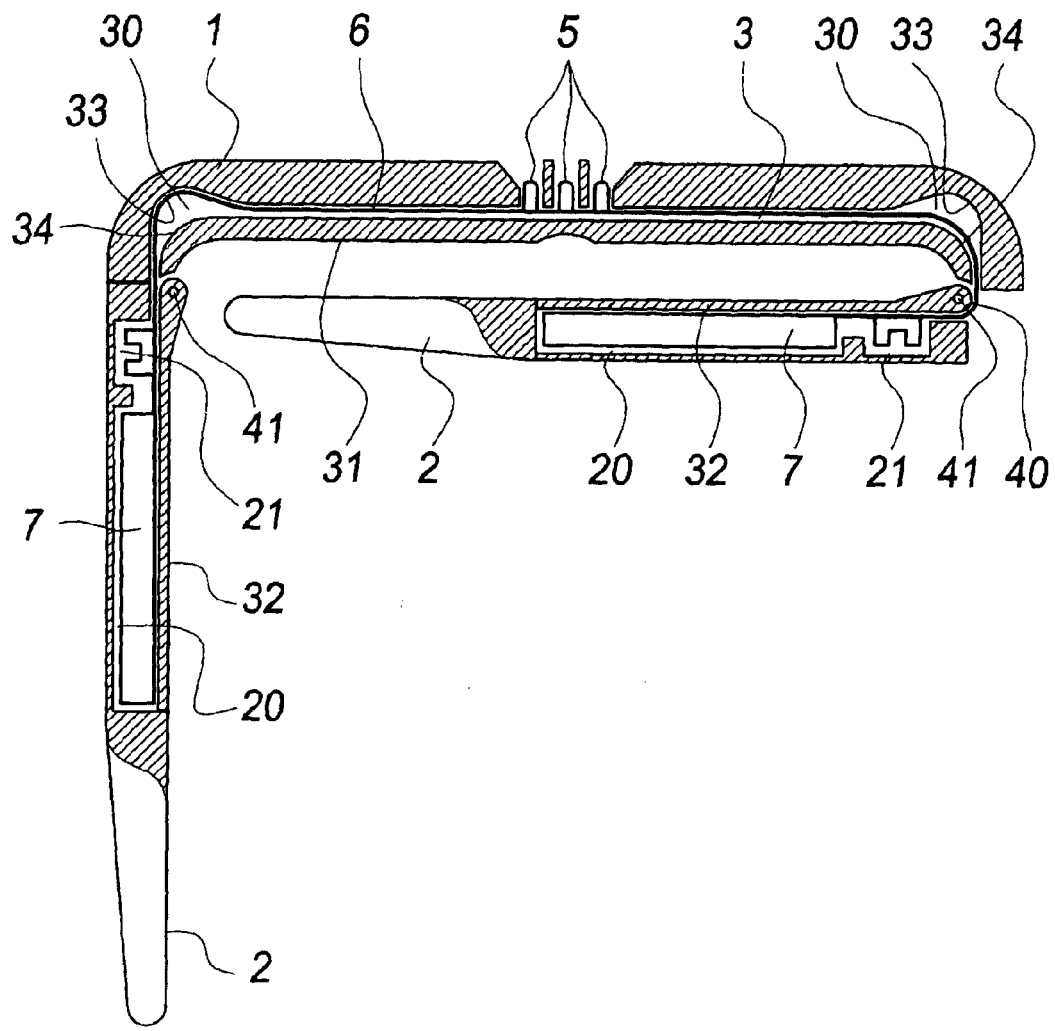
FIG. 1 is a section view of an embodiment of eyeglasses according to the present invention.

FIG. 1 shows a section view of one embodiment of eyeglasses according to the present invention, comprising a front frame 1 with two adjacent seats for mounting the lenses 10, which frame 1 is the front portion of the eyeglasses and two side arms 2 are connected thereto.

However, it is possible for the eyeglasses to be provided with a single lens, or even to be composed only of the frame and without any lenses.

The section of FIG. 1 is obtained along a plane substantially parallel to the horizontal plane when the eyeglasses are worn.

The eyeglasses comprise electric and/or electronic elements connected to one or more batteries 7 by an electric circuit 6.

In the embodiment shown in the figures, there are provided two batteries 7 housed in two predetermined housing compartments 20 formed in each of said two arms.

However, it is possible to provide several compartments formed in one or both the arms, or in suitable seats for mounting the batteries 7 outside the arms 2.

The flexible printed circuit 6 is housed into a seat 3 formed into said front frame 1 and into both arms 2.

The flexible printed circuit 6, in the preferred embodiment shown in the figures, is the only circuit to which or on which all the electric and/or electronic elements are connected or integrated, including batteries 7.

However it is possible to provide further circuits, composed for example of electric wires or tracks of a conductive material, preferably embedded in the material composing the frame, for the connection with further electric and/or electronic elements.

In the example in the figure, the seat 3 is composed of a groove obtained in the front frame 1 and in the arms 2 at the side faced towards the eyes when the eyeglasses are worn.

When the flexible printed circuit 6 is placed into the suitable seat, said seat can be closed with a corresponding front cover 31 for the portion of the front frame 1 and with a side cover 32 for the portion of the arm 2.

This arrangement is the one that provides for a higher aesthetical value to the eyeglasses when they are worn, but it is possible to provide other arrangements such as for example a groove obtained at the side opposite to the one faced towards the eyes when the eyeglasses are worn.

In one alternative embodiment, the seat is formed only in a portion of the front frame 1 and in a portion of only one arm 2.

In the areas connecting the arms 2 and the front frame 1 there are provided hinges 4 for articulating said arms, such that each arm is pivotally movable from said extreme folding position to said extreme deployment position.

Hinges 4 are shaped to allow the arms 2 to be articulated, each arm being pivotally movable about a pivot axis 41 substantially perpendicular to the longitudinal axis of the arm 2 and to the interpupillary line when the eyeglasses are worn.

In FIG. 1 the arms 2 are shown in the two extreme positions, the right arm in the extreme folding position and the left arm in the extreme deployment position respectively.

Hinges can be composed of rigid elements articulated to each other, such as in the example shown in the figures, or they can comprise deformable elements.

The hinge 4 is shaped such to be provided, on the extrados side, with a first curved and seamless resting surface 40.

When pivoting the arm 2 from the extreme deployment position to the extreme folding position, the resting surface 40 contacts a larger and larger portion of said printed circuit 6, pulling out a predetermined portion of said printed circuit 6 from said front frame 1 by dragging it.

In the embodiment shown in the figures, the predetermined portion of the flexible printed circuit 6 is pulled out when pivoting the arm 2 towards the extreme folding position from the front frame 1.

However it is possible, as said above, to provide the predetermined portion of the flexible printed circuit 6 to be pulled out as an alternative or in combination from the arm 2.

The housing seat 3 of the flexible printed circuit 6 in said front frame 1, at the hinge 4, has a widening 30 intended to house said predetermined portion of the printed circuit 6 when the arm 2 is in the extreme deployment position.

Said widening 30 is provided with a second resting surface 33 and with a third resting surface 34, curved and seamless and placed facing each other.

In the extreme deployment position of the arm 2 said predetermined portion of the flexible printed circuit 6 is inserted into the widening 30 causing said flexible printed circuit 6 to bend, such that the convex side of said flexible printed circuit 6 contacts at least partially the second resting surface 33.

When on the contrary the arm 2 is in the extreme folding position, said predetermined portion of the flexible printed circuit 6 is pulled out from the widening 30 causing said flexible printed circuit 6 to extend, such that the concave side of said flexible printed circuit 6 contacts at least partially the third resting surface 34.

In the example shown in the figures, the resting surface is obtained on the front cover 31, particularly on the wall of said front cover 31 faced towards the bottom of the groove forming the seat 3.

The side cover 32 acts as a closure both for the housing seat 3 in the arm 2 and for the housing compartment for the battery 20.

Figure 2:
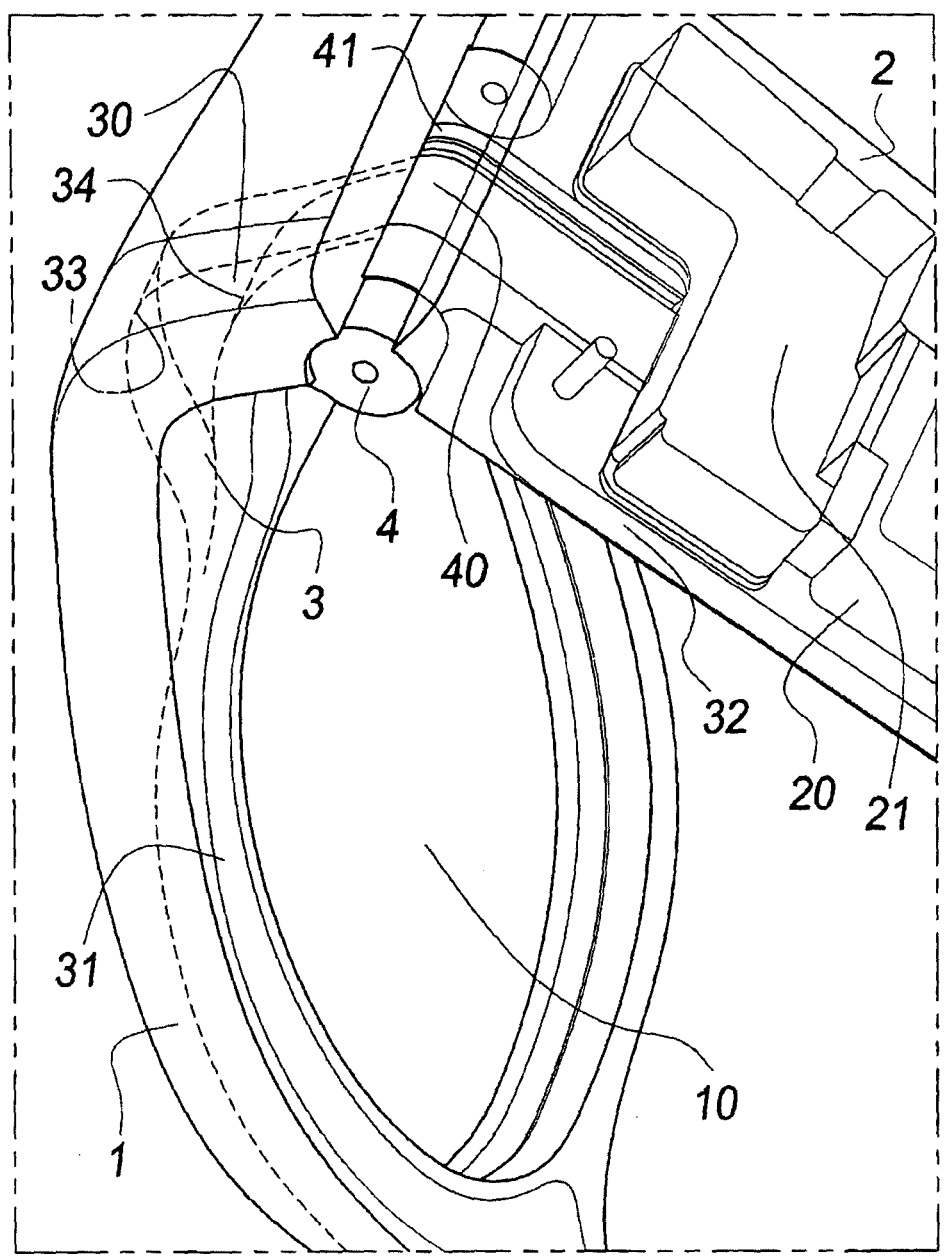
FIG. 2 is a view of a part of the front frame and of one arm.

FIG. 2 shows a detail of the region of the hinge 4, and the several inner parts of the arms 2 and of the front frame 1 are shown in phantom.

Particularly the hinge 4 is composed of two partially cylindrical shaped ends made as one piece with the front frame 1 at one side end, two ends with a substantially equal shape being fitted therebetween made as one piece with the arm 2 at one end thereof.

The first resting surface 40 is obtained on an enlarged terminal 41 of the side cover 32, shaped in such a manner that when the side cover 32 is in the condition mounted on the arm 2, said enlarged terminal 41 is fitted between the articulated components of the arm 2 and of the front frame 1 composing the hinge 4, and puts said first resting surface 40 in the operating position.

The ends of the front frame 1 and of the arm 2 are hinged to each other they being provided with central holes, such that when the arm 2 is in a position engaged in the front frame 1, the central holes are arranged along the pivot axis 41 such that the arm 2 and the front frame 1 are pivotally coupled to each other by means of two pins.

The partially cylindrical shaped ends of the arm 2 are spaced such to define a gap therebetween intended to house said enlarged terminal 41 of the side cover 32.

Other arrangements of the hinge are possible.

In FIG. 2 the arm 2 is partially folded towards the front frame, and the first resting surface 40 obtained on the enlarged terminal 41 is clearly visible.

As it can be clearly seen, in the embodiment shown in the figures the seat 3 is placed on the upper part of the lenses 10 when the eyeglasses are worn, but in combination or as an alternative it is possible to provide a seat placed at least partially below a lens 10.

Figure 3:
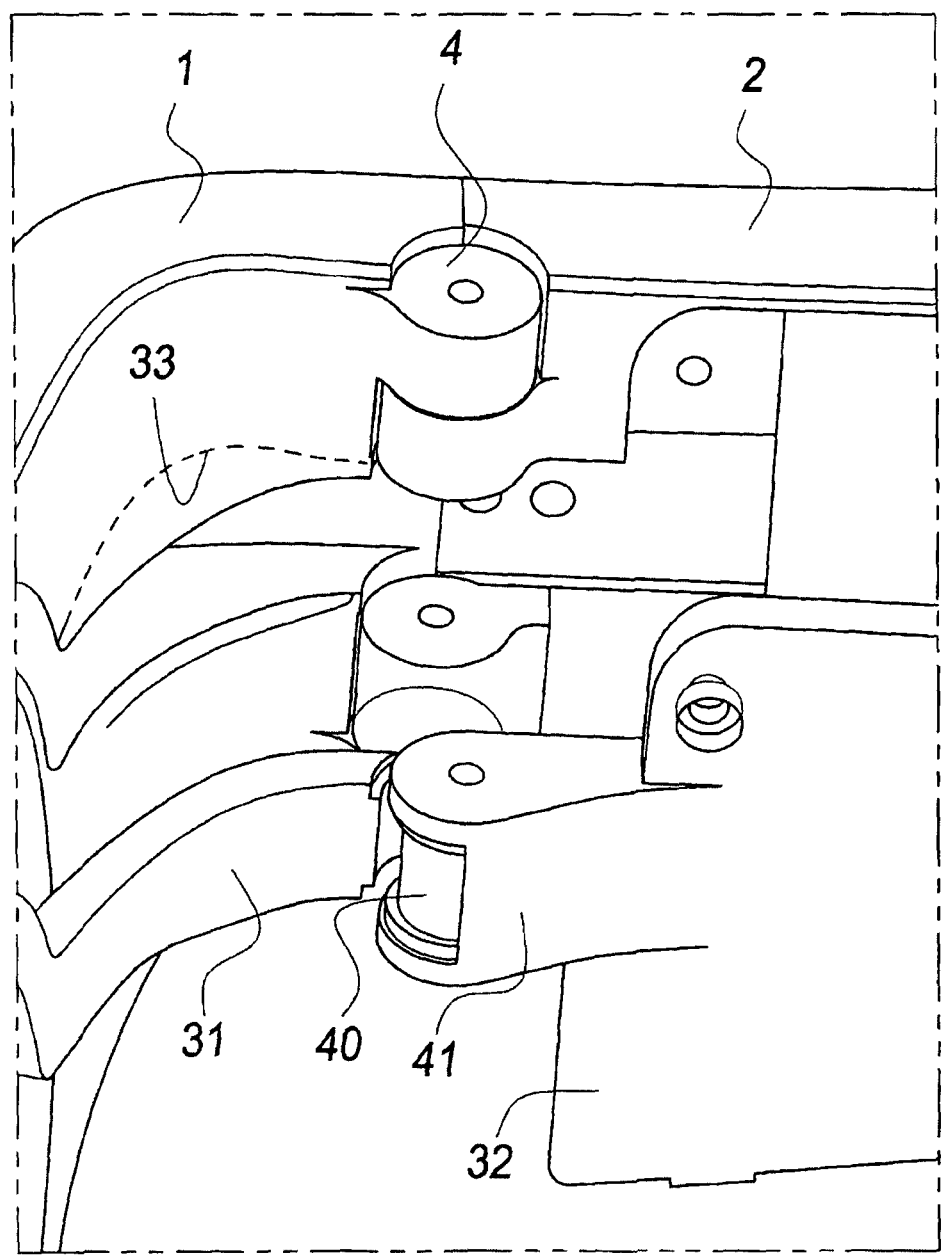
FIGS. 3 and 4 are different views of an exploded view of the hinge.
Figure 4:
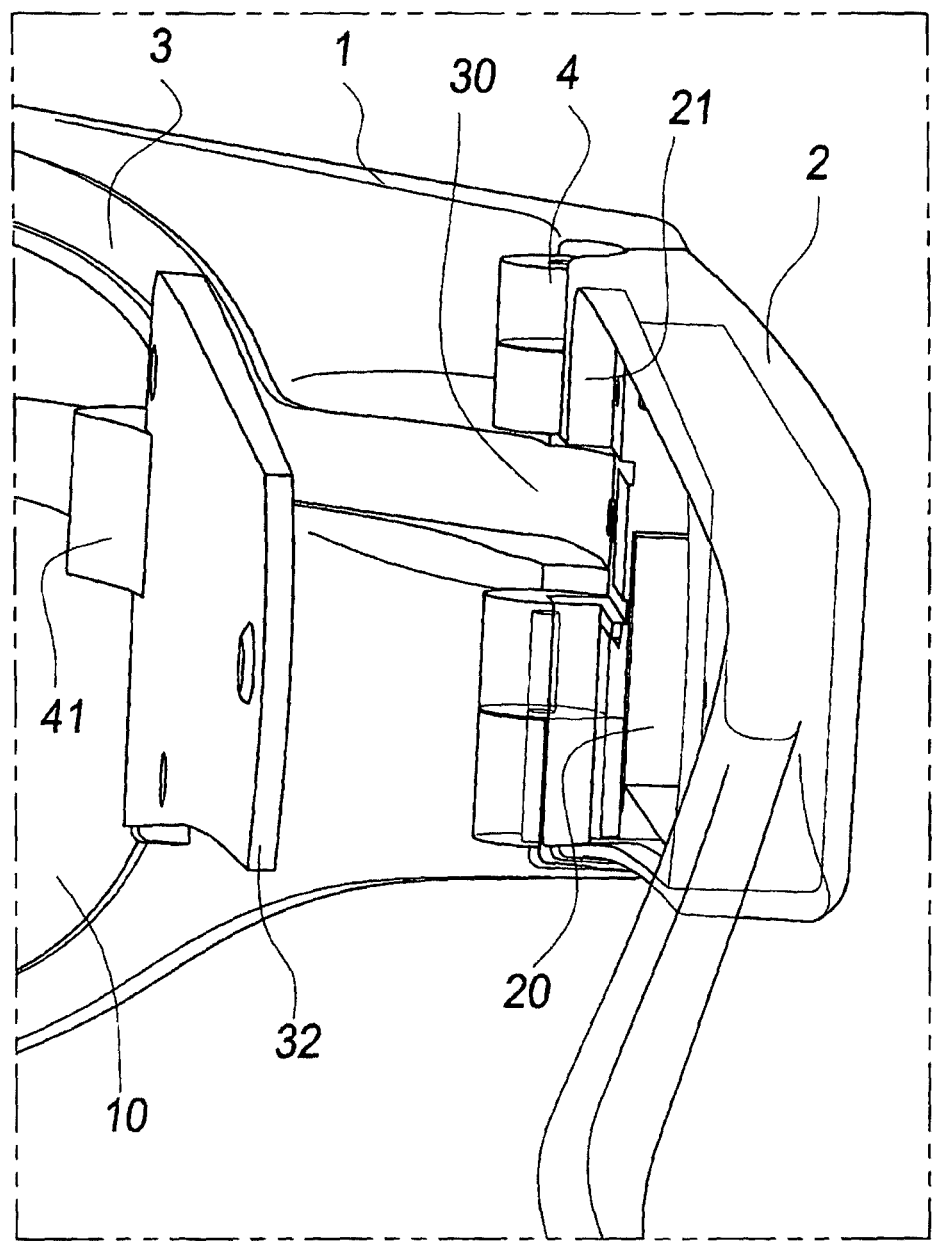

In FIGS. 3 and 4, the side cover 32 and the front cover 31 are shown as separated from the arm 2 such to show a detail of the area of the hinge 4 and of the inner parts of the arm 2 and of the front frame 1.

As it can be clearly seen, the second resting surface 33 and the third resting surface 34 are shaped such to be connected to the first resting surface 40 with the side cover 32 in the mounted condition substantially without interruption.

The first resting surface 40, the second resting surface 33 and the third resting surface 34 have such radii of curvature to prevent the flexible printed circuit from permanently bending in the different positions taken when pivoting the arm 2.

Said electric and/or electronic elements can be of any type, provided that they are intended for being mounted on eyeglasses.

FIG. 4 shows a view taken from the free end of the arm 2 and in the direction of the front frame 1, with the arm 2 in the extreme deployment position.

The separated cover 32 allows the housing compartment 20 of the battery 7 (not shown in the figure) and the housing compartments 21 of additional electric and/or electronic elements to be seen.

Figure 5:
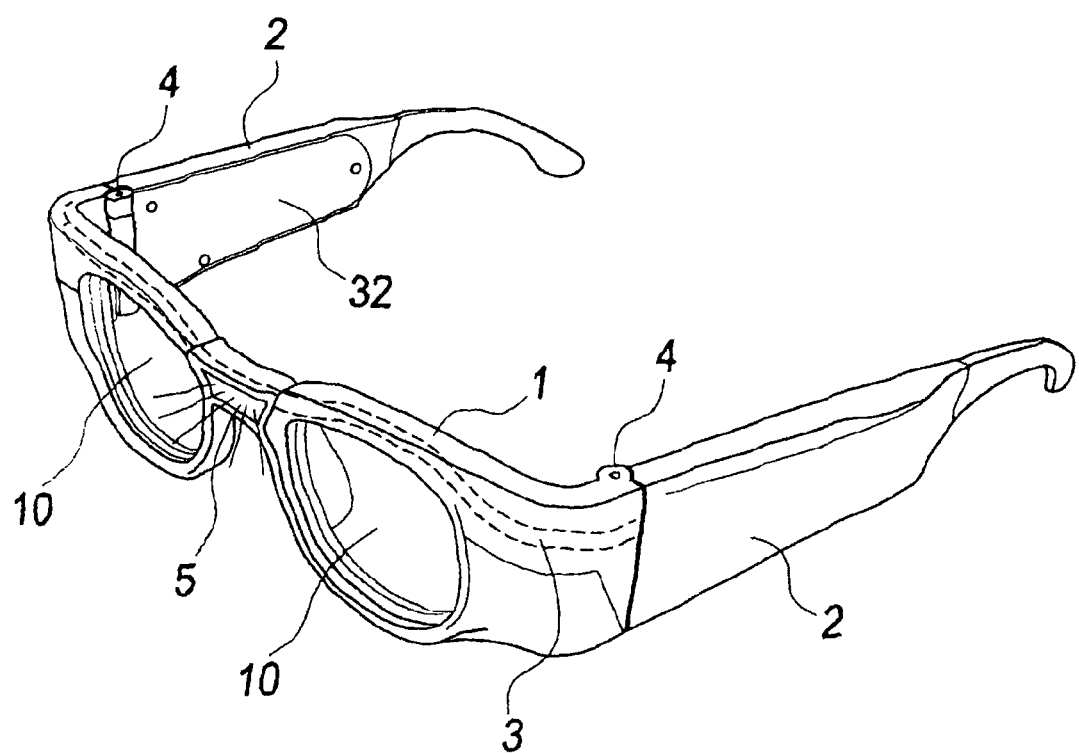
FIG. 5 is an overview of one embodiment of the eyeglasses according to the present invention.

In the embodiment shown in FIG. 5, the electric and/or electronic elements comprise one or more LEDs 5.

Such LEDs are placed at the front between the lenses and radiate light on the front side of the front frame 1, that is, the side opposite to the one faced towards the eyes with the eyeglasses worn, by means of suitable cut-outs obtained in the front side of the front frame 1.

According to this example, there are further provided electronic components for switching on and off said LEDs 5, for recharging the batteries 7, and for managing the supply of electric current from batteries 7 to LEDs 5.

Such components are integrated on the printed circuit and are housed into two suitable housing compartments 21 provided in the arms 2, for example visible in FIG. 1.

According to another embodiment not shown in the figures, the eyeglasses are provided with additional electric and/or electronic elements, which have been described above.

Such devices can be arranged in the arms 2 or in the front frame 1 and can be put in electrical communication with each other and can be powered by the batteries 7 by means of said flexible printed circuit 6.

Said flexible printed circuit 6 can be further at least partially embedded into the material composing the eyeglasses during manufacturing.

The invention claimed is:

1. Eyeglasses comprising:
   a front frame (1) to which two side arms (2) are connected; and
   electric or electronic elements (5) connected to each other by an electric circuit (6),
   wherein said electric circuit is composed at least partially of at least one flexible printed circuit (6), which is housed into a seat (3) formed at least partially inside said front frame (1) and at least partially inside at least one of the two side arms (2).

2. The eyeglasses according to claim 1, wherein said electric or electronic elements comprise one or more batteries (7) housed into predetermined housing compartments (20) formed into one or both of said arms (2) or said front frame (1), and wherein said electric circuit comprises a single flexible printed circuit (6), said electric or electronic elements being connected thereto or integrated thereon.

3. The eyeglasses according to claim 2, wherein there are provided at least two batteries (7) housed into at least two predetermined housing compartments (20) formed into each one of said two side arms (2), said flexible printed circuit (6) being housed into a seat (3) formed into said front frame (1) and into both of said side arms (2).

4. The eyeglasses according to claim 3, wherein said seat has a thickness corresponding to a thickness of said flexible printed circuit.

5. The eyeglasses according to one-claim 1, wherein said arms are at least partially made of a rigid material.

6. The eyeglasses according to claim 1, wherein said electric or electronic elements comprise one or more LEDs (5).

7. The eyeglasses according to claim 1, wherein said electric or electronic elements comprise one or more of a sensor, a processor, a remote communication unit, a display, or a sound speaker.

8. Eyeglasses comprising:
- a front frame (1) to which two side arms (2) are connected; and
- electric or electronic elements (5) connected to each other by an electric circuit (6), wherein said electric circuit is composed at least partially of at least one flexible printed circuit (6), which is housed into a seat (3) formed at least partially inside said front frame (1) and at least partially inside at least one of the two side arms (2); and
- hinges provided at areas connecting said side arms (2) and the front frame (1), said hinges articulating said side arms (2), such that each arm (2) is pivotally movable about a pivot axis (41) substantially perpendicular to a longitudinal axis of the arm (2) and to an interpupillary line when the eyeglasses are worn, from an extreme folding position wherein said arm (2) is oriented collapsed against a rear side of the front frame (1) to an extreme deployment position wherein said arm is moved away from the other one of said two arms and it substantially transverse to an extension of the front frame (1),
- wherein at least one of said hinges (4) is shaped to be provided, at an extrados side, with a first, curved and seamless resting surface (40), such that, when pivoting the arm (2) from said extreme deployment position to said extreme folding position, said resting surface (40) contacts a larger and larger portion of said printed circuit (6), pulling out a predetermined portion of said printed circuit (6) from one or both of said front frame (1) or said arm (2) by dragging.

9. The eyeglasses according to claim 8, wherein said seat (3) housing said flexible printed circuit (6) in one or both of said front frame (1) or at least one arm (2) has at least a widening (30) intended to house said predetermined portion of said flexible printed circuit (6) when the arm (2) is in the deployment position.

10. The eyeglasses according to claim 9, wherein said widening (30) is provided with a second curved and seamless resting surface (33) such that, in the extreme deployment position of the arm (2), said predetermined portion of the flexible printed circuit (6) is fitted into said widening (30) causing said flexible printed circuit (6) to bend, such that a convex side of said flexible printed circuit (6) contacts at least partially said second resting surface (33).

11. The eyeglasses according to claim 10, wherein said widening (30) is provided with a third curved and seamless resting surface (34) such that, in the extreme folding position of the arm (2), said predetermined portion of the flexible printed circuit (6) is pulled out from said widening (30), causing said flexible printed circuit to extend, such that a concave side of said flexible printed circuit (6) contacts at least partially said third resting surface (34).

12. The eyeglasses according to claim 11, wherein one or more of said first resting surface (40), said second resting surface (33), or said third resting surface (34) have such radii of curvature that said flexible printed circuit (6) is prevented from being permanently bent in a resting condition on said first resting surface (40), said second resting surface (33), or said third resting surface (34).

* * * * *